US012700683B2

(12) United States Patent
Dong et al.

(10) Patent No.: US 12,700,683 B2
(45) Date of Patent: Aug. 4, 2026

(54) METHOD AND DEVICE FOR A HIGH POLARIZATION ISOLATION FENCE

(71) Applicants: China Automotive Technology and Research Center Co., Ltd., Tianjin (CN); Catarc Automotive Test Center (Tianjin) Co., Ltd., Tianjin (CN)

(72) Inventors: Changqing Dong, Tianjin (CN); Kongjian Qin, Tianjin (CN); Guokai Jiang, Tianjin (CN); Jiaxu Feng, Tianjin (CN); Xiaodi Tian, Tianjin (CN); Fujian He, Tianjin (CN); Qipeng Zhang, Tianjin (CN); Zhe Tian, Tianjin (CN); Meng Zhao, Tianjin (CN); Xiucheng Li, Tianjin (CN); Shasha Tang, Tianjin (CN); Jinman Guo, Tianjin (CN); Peng Gao, Tianjin (CN); Jiandong Guo, Tianjin (CN); Yu Wang, Tianjin (CN); Guotian Ji, Tianjin (CN)

(73) Assignees: China Automotive Technology and Research Center Co., Ltd., Tianjin (CN); Catarc Automotive Test Center (Tianjin) Co., Ltd., Tianjin (CN)

( * ) Notice: Subject to any disclaimer, the term of this patent is extended or adjusted under 35 U.S.C. 154(b) by 68 days.

(21) Appl. No.: 18/968,891

(22) Filed: Dec. 4, 2024

(65) Prior Publication Data

US 2025/0192451 A1 Jun. 12, 2025

(30) Foreign Application Priority Data

Dec. 12, 2023 (CN) ........................ 202311694357.X

(51) Int. Cl.

| | |
|---|---|
| ***H01Q 15/24*** | (2006.01) |
| ***H01Q 5/28*** | (2015.01) |
| ***H01Q 19/10*** | (2006.01) |
| ***H01Q 25/00*** | (2006.01) |

(52) U.S. Cl.

CPC ............. *H01Q 25/001* (2013.01); *H01Q 5/28* (2015.01)

(58) Field of Classification Search

CPC ...... H01Q 15/24; H01Q 25/00; H01Q 25/001; H01Q 5/20; H01Q 5/28; H01Q 5/30; H01Q 19/10

See application file for complete search history.

(56) References Cited

U.S. PATENT DOCUMENTS

| | | | | |
|---|---|---|---|---|
| 4,219,820 A * | 8/1980 | Crail | ...................... | H01Q 15/24 343/756 |
| 4,435,714 A * | 3/1984 | Luh | ........................ | H01Q 15/22 343/756 |

(Continued)

FOREIGN PATENT DOCUMENTS

| | | |
|---|---|---|
| CN | 109980358 A | 7/2019 |
| CN | 110610018 A | 12/2019 |
| CN | 116632556 A | 8/2023 |

OTHER PUBLICATIONS

Chen, H., B. F. He, and Y. X. Zhang. "Study on large angle slotted waveguide antenna with low sidelobe." Journal of Microwaves 30.S1 (2014): 283-286.No Information Found.

Y. Xu, et al. "Design of a Omnidirectional Ultra-wideband Oblique Polarized Antenna." National Conference Antennas. 2021. Yuanchao Xu,Jian Chen,Xiang Xia,Zhifeng Jin,Qing Zhang,Baiquan Ning,Xu Zhao, "Design of aOmnidirectional ultra-wideband Oblique polarized Antenna", Nan Jing Institute of Electronic Equipment, Nan Jing, China, 2021, 356.

(Continued)

*Primary Examiner* — Tho G Phan

(74) *Attorney, Agent, or Firm* — IPro, PLLC

(57) ABSTRACT

The present disclosure provides a design method and device for a high polarization isolation fence which includes the following steps: Setting the material, application environment, and initial structural parameters of the high polarization isolation fence to form an initialized high polarization isolation fence and performing it to obtain antenna performance parameters with the initialized high polarization isolation fence and without the high polarization isolation (Continued)

fence loaded; Debugging the initial structural parameters to determine the optimization range corresponding to each structural parameter; and obtaining the target high polarization isolation fence based on the optimization range corresponding to each structural parameter and the current antenna performance parameters of the initialized high polarization isolation fence. Based on the optimization range, this design method can quickly select the structural parameters of the target high polarization isolation fence with excellent performance, and effectively reduce the design difficulties.

8 Claims, 7 Drawing Sheets

(56) References Cited

U.S. PATENT DOCUMENTS

| | | | | |
|---|---|---|---|---|
| 8,059,051 | B2 * | 11/2011 | Manasson | H01Q 13/28 343/785 |
| 10,777,901 | B2 * | 9/2020 | Franklin | H01Q 21/065 |
| 12,142,839 | B2 * | 11/2024 | Wen | H01Q 1/526 |
| 12,183,966 | B2 * | 12/2024 | Kasani | H01Q 21/0025 |
| 12,412,995 | B2 * | 9/2025 | Zhang | H01Q 21/061 |

OTHER PUBLICATIONS

F. Shang, et al. "A study and design on the wideband meander-line polarizer." Journal of Xian University of Posts and Telecommunications 22(5) (2017): 78-83.No Information Found.

* cited by examiner

METHOD AND DEVICE FOR A HIGH POLARIZATION ISOLATION FENCE

CROSS-REFERENCE TO RELATED APPLICATIONS

This application is based on and claims the benefit of priority to the Chinese patent application No. 202311694357.X filed on Dec. 12, 2023, which is hereby incorporated by reference in its entirety into the present application.

TECHNICAL FIELD

The present disclosure generally relates to the field of antenna technology, and particularly, to a design method and device for a high polarization isolation fence.

BACKGROUND

The electric field of a linearly polarized electromagnetic wave oscillates in the same plane, typically employing horizontal or vertical polarization. For radio communication, the selection of antenna polarization needs to consider the interaction between electromagnetic waves and the antenna, as well as factors such as signal propagation environment and distance. Improving the polarization purity of the antenna can enhance signal quality and reliability.

During transmission, due to the feed antenna design, the signal on the feed antenna is simultaneously emitted in multiple polarization modes, such as through multiple antennas or a mixture of polarization modes, resulting in the polarization direction of the received signal being inconsistent with the polarization direction of the transmitting antenna. This inconsistency in polarization direction between the received electromagnetic wave and the transmitted electromagnetic wave leads to signal weakening and attenuation.

A common method to reduce cross-polarization is to select antenna materials with high quality and thermal stability during the antenna design process to minimize polarization changes caused by environmental variations such as temperature and humidity. Alternatively, adjusting the structural design of the antenna, such as its size, shape, and angle, during the design process can also reduce polarization changes caused by the antenna's inherent characteristics, thereby mitigating the impact of cross-polarization. However, both methods increase the complexity of antenna design and elevate design and manufacturing costs. Polarization selectors derived from the aforementioned situations also require complex equipment and technical conditions for implementation. Therefore, we propose a design method for a high polarization isolation fence to address the above issues.

SUMMARY

In view of the above-mentioned defects or deficiencies in the prior art, it is desirable to provide a design method and device for a high polarization isolation fence with high polarization purity and simple design.

In a first aspect, the present disclosure provides a design method for a high polarization isolation fence. The high polarization isolation fence includes a plurality of grating strips arranged along a first direction. The first direction is set parallel to the polarization direction of the feed antenna. The feed antenna has a feed aperture.

The design method includes the following steps:

Setting materials, application environment, and initial structural parameters of the high polarization isolation fence to form an initialized high polarization isolation fence. The structural parameters at least include: the distance between the high polarization isolation fence and the feed aperture, the center distance between adjacent grating strips, the length and width of a single grating strip, the total length and total width of the high polarization isolation fence, and the shape of the grating strip; and Performing performance tests on the initialized high polarization isolation fence to obtain antenna performance parameters with the initialized high polarization isolation fence and without the high polarization isolation fence loaded. The antenna performance parameters at least include: the cross-polarization signal strength within the 3 dB beamwidth range of the antenna, the main polarization echo signal strength of the antenna, and the antenna radiation pattern; and Debugging the initial structural parameters of the initialized high polarization isolation fence according to the antenna performance parameters to determine the optimization range corresponding to each structural parameter; and Calculating the correspondence between the optimization range of each structural parameter and the attribute parameters of the current feed antenna, and obtaining the target high polarization isolation fence based on the optimization range corresponding to each structural parameter and the current antenna performance parameters of the initialized high polarization isolation fence.

According to the technical solution provided in the embodiments of the present disclosure, the step of calculating the correspondence between the optimization range of each structural parameter and the attribute parameters of the current feed antenna specifically includes:

Obtaining the attribute parameters of the feed antenna. The attribute parameters at least include the operating frequency range and the maximum aperture of the feed antenna; and Confirming the correspondence between the optimization range of the distance between the high polarization isolation fence and the feed aperture, the optimization range of the center distance between adjacent grating strips, and the optimization range of the width of a single grating strip and the attribute parameters of the feed antenna based on the wavelength corresponding to the lowest operating frequency in the operating frequency range; and Confirming the correspondence between the optimization range of single grating strip length and the optimization range of the total length and total width of the high polarization isolation fence and the attribute parameters of the feed antenna based on the maximum aperture of the feed antenna.

According to the technical solution provided in the embodiments of the present disclosure, the correspondence between the optimization range of the distance between the high polarization isolation fence and the feed aperture, the optimization range of the center distance between adjacent grating strips, and the optimization range of the width of a single grating strip and the attribute parameters of the feed antenna specifically includes:

The distance optimization range is 0.45-0.55 times the wavelength corresponding to the lowest operating frequency; and The center distance optimization range is 0.07-0.1 times the wavelength corresponding to the lowest operating frequency; and The width optimization range is 0.02-0.03 times the wavelength corresponding to the lowest operating frequency.

According to the technical solution provided in the embodiments of the present disclosure, the correspondence between the optimization range of single grating strip length, the optimization range of the total length and total width of the high polarization isolation fence, and the attribute parameters of the feed antenna specifically includes:

The length optimization range and the total length optimization range are both 1.7-1.8 times the maximum aperture; and The total width optimization range is 1-1.1 times the maximum aperture.

According to the technical solution provided in the embodiments of the present disclosure, the step of obtaining the target high polarization isolation fence based on the optimization range corresponding to each structural parameter and the current antenna performance parameters of the initialized high polarization isolation fence specifically includes:

Selecting candidate structural parameters within the optimization range corresponding to each structural parameter, and performing parameterized modeling according to the candidate structural parameters to obtain a candidate high polarization isolation fence model; and Performing parameter scanning on the candidate high polarization isolation fence model within the optimization range of each structural parameter and obtaining the antenna performance parameters corresponding to the candidate high polarization isolation fence model; and Obtaining the antenna performance parameters when the high polarization isolation fence is not loaded, and selecting the optimal structural parameters within the corresponding optimization range of each structural parameter by comparing with the antenna performance parameters when the candidate high polarization isolation fence model is provided, to form the target high polarization isolation fence.

According to the technical solution provided in the embodiments of the present disclosure, the step of confirming the optimization range of the distance between the high polarization isolation fence and the feed aperture based on the wavelength corresponding to the lowest operating frequency in the operating frequency range further includes:

When 0.45-0.55 times the wavelength corresponding to the lowest operating frequency is used as the distance optimization range, obtaining the cross-polarization signal strength, the main polarization echo signal strength, and the antenna radiation pattern in the entire frequency band of the antenna to confirm that the current antenna performance index is within the preset effect.

According to the technical solution provided in the embodiments of the present disclosure, debugging the initial structural parameters of the initialized high polarization isolation fence according to the antenna performance parameters to determine the optimization range corresponding to each structural parameter includes:

Minimizing the leakage of electromagnetic waves with polarization perpendicular to the high polarization isolation fence, while maximizing the transmission of electromagnetic waves with polarization parallel to the high polarization isolation fence to minimize insertion loss.

Based on the performance test on the initialized high polarization isolation fence, obtaining the ratio of the width of the grating strip to the center distance between adjacent grating strips within the range of 0.3-0.5 to achieve minimized insertion loss.

In a second aspect, the present disclosure provides a design device for a high polarization isolation fence, comprising:

A structural parameter setting module configured to set the material, application environment, and initial structural parameters of the high polarization isolation fence to form an initialized high polarization isolation fence. The structural parameters at least include: the distance between the high polarization isolation fence and the feed aperture, the center distance between adjacent grating strips, the length and width of a single grating strip, the total length and total width of the high polarization isolation fence, and the shape of the grating strip; and A performance testing module configured to perform performance tests on the initialized high polarization isolation fence to obtain antenna performance parameters with the initialized high polarization isolation fence and without the high polarization isolation fence loaded. The antenna performance parameters at least include: the cross-polarization signal strength within the 3 dB beamwidth range of the antenna, the main polarization echo signal strength of the antenna, and the antenna radiation pattern; and A structural parameter debugging module configured to debug the initial structural parameters of the initialized high polarization isolation fence according to the antenna performance parameters to determine the optimization range corresponding to each structural parameter and to obtain the target high polarization isolation fence based on the optimization range corresponding to each structural parameter and the current antenna performance parameters of the initialized high polarization isolation fence; and A correspondence calculation module configured to calculate the correspondence between the optimization range of each structural parameter and the attribute parameters of the current feed antenna.

In summary, the present disclosure specifically discloses a design method and device for a high polarization isolation fence. The design method includes the following steps: setting materials, application environment, and initial structural parameters of the high polarization isolation fence to form an initialized high polarization isolation fence; performing performance tests on the initialized high polarization isolation fence to obtain antenna performance parameters with the initialized high polarization isolation fence and without the high polarization isolation fence loaded; debugging the initial structural parameters of the initialized high polarization isolation fence according to the antenna performance parameters to determine the optimization range corresponding to each structural parameter; calculating the correspondence between the optimization range of each structural parameter and the attribute parameters of the current feed antenna, and obtaining the target high polarization isolation fence based on the optimization range corresponding to each structural parameter and the current antenna performance parameters of the initialized high polarization isolation fence.

Existing methods for reducing cross-polarization typically employ means of optimizing the antenna design or using polarization selectors to control the antenna to receive only one or more polarization modes of electromagnetic waves. However, these means often require complex equipment and technical conditions for implementation. By combining performance testing of the high polarization isolation fence, the present disclosure first obtains a preliminary optimization range for each structural parameter of the high polarization isolation fence. Based on this optimization range, a target high polarization isolation fence with excellent performance can be selected more quickly. Furthermore, a correspondence relationship can be established between the optimization range corresponding to each structural parameter and the feed antenna structural parameters, thereby providing convenient conditions for the subsequent design of polarization isolation fences. Thus, this method not only simplifies the entire design process but also eliminates the need for complex equipment and technical conditions.

BRIEF DESCRIPTION OF DRAWINGS

The other features, objects, and advantages of the present disclosure will become more apparent from the following detailed description of the non-limiting embodiments with reference to the accompanying drawings below.

Figure 1:
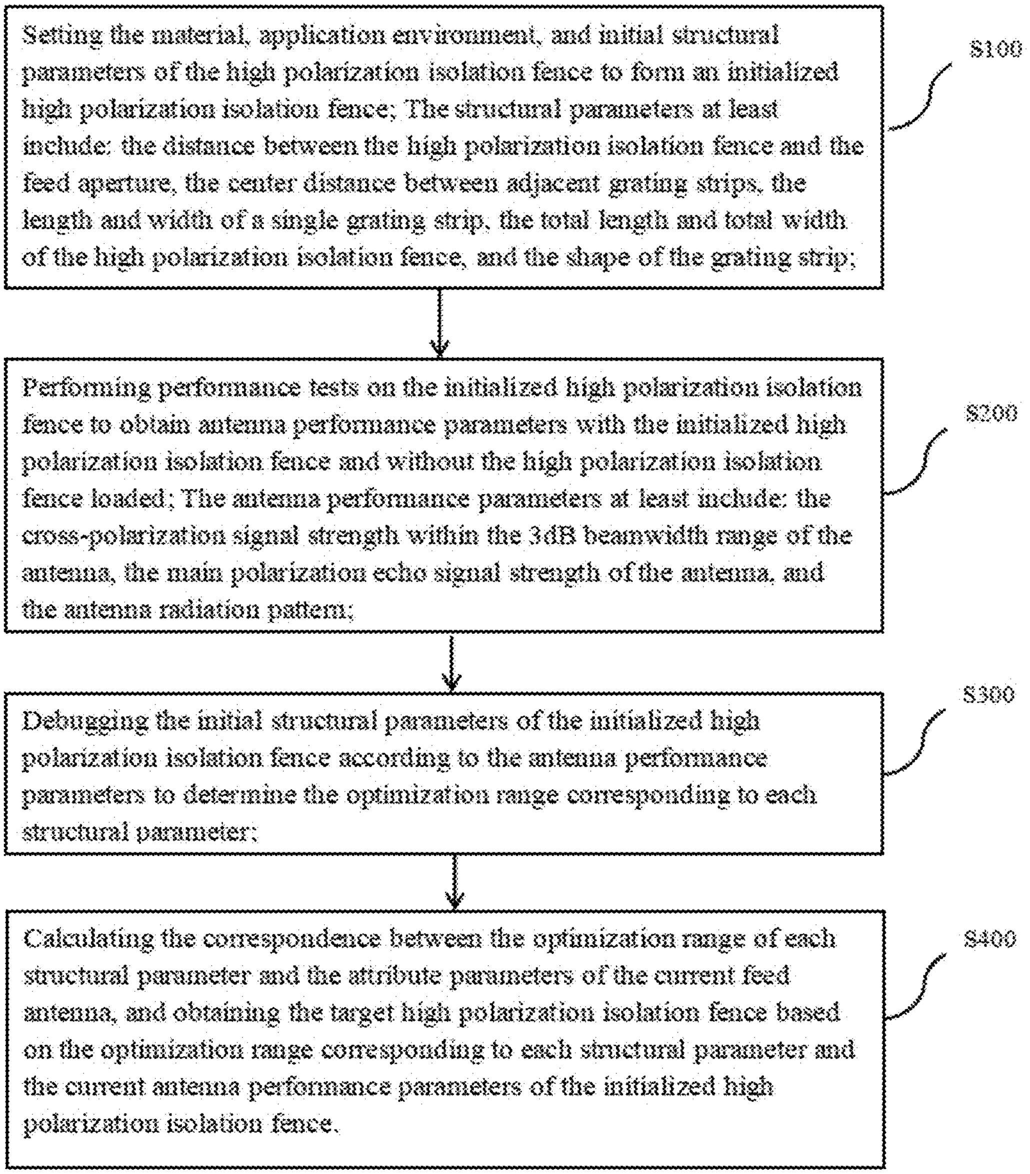
FIG. 1 is a flowchart illustrating a design method for a high polarization isolation fence.

Reference numerals in the drawings: 1, high polarization isolation fence; 11, grating strip; 2, feed antenna; 3, feed aperture; 4, design device; 41, structural parameter setting module; 42, performance testing module; 43, structural parameter debugging module; 44, correspondence calculation module.

DETAILED DESCRIPTION

The present disclosure will be further described in detail below in conjunction with the accompanying drawings and embodiments. It should be understood that the specific embodiments described herein are merely for the purpose of illustrating the relevant inventions and not for the purpose of limiting the inventions. It should also be noted that, for ease of description, only portions relevant to the present disclosure are shown in the drawings.

It should be noted that the embodiments of the present disclosure and the features in the embodiments can be combined with each other without conflict. the present disclosure will be described in detail below with reference to the accompanying drawings and in conjunction with the embodiments.

Example 1

In the microwave frequency band, cylindrical bodies can be used to control the polarization state of electromagnetic waves, thereby forming a polarization isolation fence. By utilizing the characteristics of polarization isolation fences, such as absorption, reflection, or rotation of electromagnetic fields, the polarization direction of electromagnetic waves can be controlled. When electromagnetic waves pass through the polarization isolation fence, the cylindrical bodies interfere with the polarization transmitted by the feed antenna. The arrangement direction of the cylindrical bodies of the polarization isolation fence allows only electromagnetic waves polarized in a certain direction to pass through, without converting electromagnetic waves polarized in another direction. This achieves polarization control of electromagnetic waves to enhance the polarization purity of the antenna.

Figure 2:
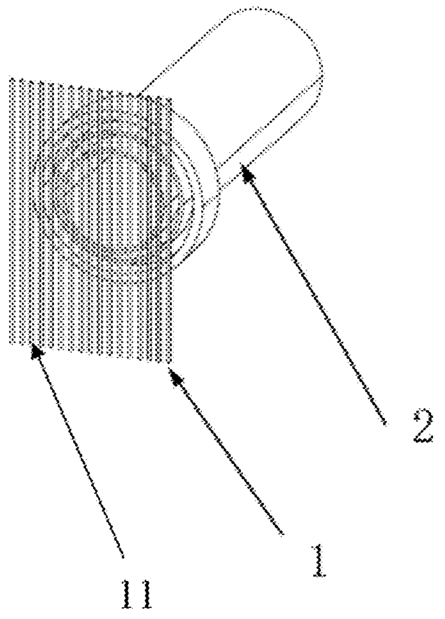
FIG. 2 is a schematic diagram illustrating the overall structure of a high polarization isolation fence.

Further, with reference to FIG. 2, the structure of a high polarization isolation fence is described.

Figure 3:
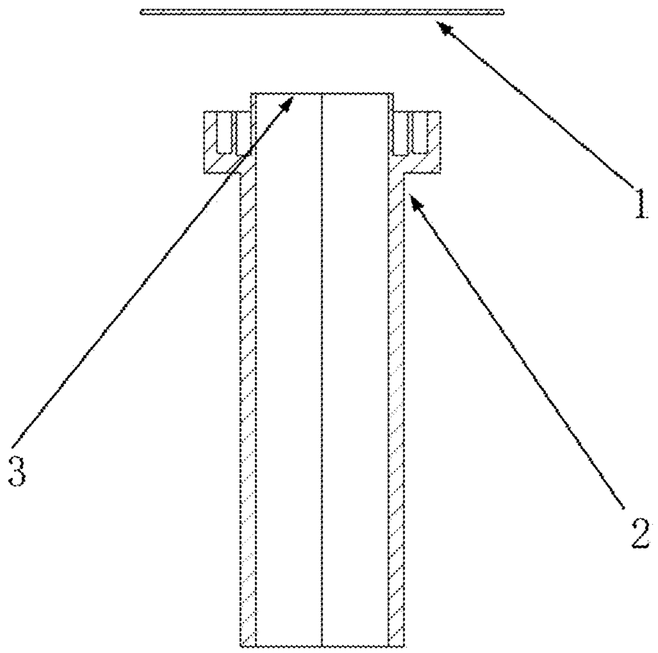
FIG. 3 is a schematic diagram illustrating a transverse cross-section of the structure of a high polarization isolation fence.
Figure 4:
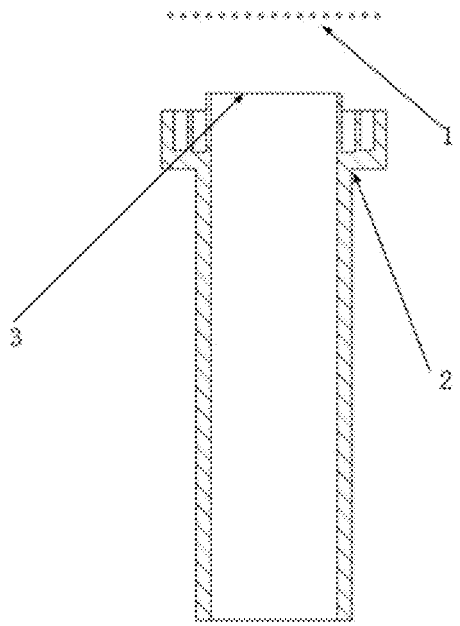
FIG. 4 is a schematic diagram illustrating a longitudinal cross-section of the structure of a high polarization isolation fence.

The high polarization isolation fence 1 shown in the present disclosure includes a plurality of grating strips 11 arranged along a first direction. The first direction is set parallel to the polarization direction of the feed antenna 2. Specifically, the feed antenna 2 is the radiating part, which directly affects the operating frequency band and overall performance of the antenna. The final high polarization isolation fence formed in the present disclosure is composed of 17 cylindrical grating strips. The cylindrical grating strips are made of metal. The final overall structure is shown in FIG. 2, the transverse cross-section is shown in FIG. 3, and the longitudinal cross-section is shown in FIG. 4.

To ensure a clear and concise description of the following embodiments, a brief introduction to the relevant technology is provided first:

Antenna polarization refers to the polarization state of electromagnetic waves emitted or received by an antenna.

The polarization of an electromagnetic wave refers to the direction of oscillation of the electric field of the electromagnetic wave in a plane perpendicular to the direction of wave propagation. Antenna polarization typically has three types: linear polarization, circular polarization, and elliptical polarization.

In terms of craftsmanship, the processing material of the polarization isolation fence can be metal, selected from aluminum, iron, tin, copper, silver, gold, platinum, or an alloy of the aforementioned metals. Materials with high dielectric constant and low dielectric loss can also be selected to reduce polarizability. The specific selection can be determined according to actual design requirements and is not particularly limited herein.

Furthermore, the shape of the grating strip 11 cylindrical bodies that constitute the high polarization isolation fence 1 can be cylindrical, prismatic, or rectangular, which can also be determined according to actual design requirements.

Please refer to the flowchart illustrating the design method for a high polarization isolation fence provided in this example, as shown in FIG. 1. The design method includes the following steps:

S100: Setting materials, application environment, and initial structural parameters of the high polarization isolation fence to form an initialized high polarization isolation fence. The structural parameters at least include: the distance between the high polarization isolation fence and the feed aperture, the center distance between adjacent grating strips, the length and width of a single grating strip, the total length and total width of the high polarization isolation fence, and the shape of the grating strip; and In the actual design process, the material of the high polarization isolation fence is related to the development requirements and can be selected from the aforementioned metals, so it is not particularly limited. The application environment of the high polarization isolation fence can be understood as its usage environment, which is generally selected as air. Furthermore, the shape of the grating strips that constitute the high polarization isolation fence can be cylindrical, prismatic, rectangular, etc., and is not particularly limited.

Specifically, when setting the initial structural parameters of the high polarization isolation fence, they can be initially set in conjunction with the attribute parameters of the feed antenna 2. For example, if the feed antenna 2 used is an 8-12 GHz wide-beam corrugated horn as the transmitting feed antenna, the maximum aperture of the feed antenna is 46 mm, and the wavelength corresponding to the lowest operating frequency of 8 GHz of the feed antenna is 37.47 mm, then the total length and total width of the initialized high polarization isolation fence should be at least not less than 46 mm to avoid the polarization isolation fence being too small, which would prevent the electromagnetic waves emitted by the feed antenna 2 from passing through the polarization isolation fence. After considering a certain range for the total length and total width, the center distance between adjacent grating strips can be initially set.

S200: Performing performance tests on the initialized high polarization isolation fence to obtain antenna performance parameters with the initialized high polarization isolation fence and without the high polarization isolation fence loaded. The antenna performance parameters at least include: the cross-polarization signal strength within the 3 dB beamwidth range of the antenna, the main polarization echo signal strength of the antenna, and the antenna radiation pattern; and In the actual design process, the performance test of the initialized high polarization isolation fence can be achieved through simulation verification, as shown in the simulation comparisons in FIGS. 5-12.

Figure 5:
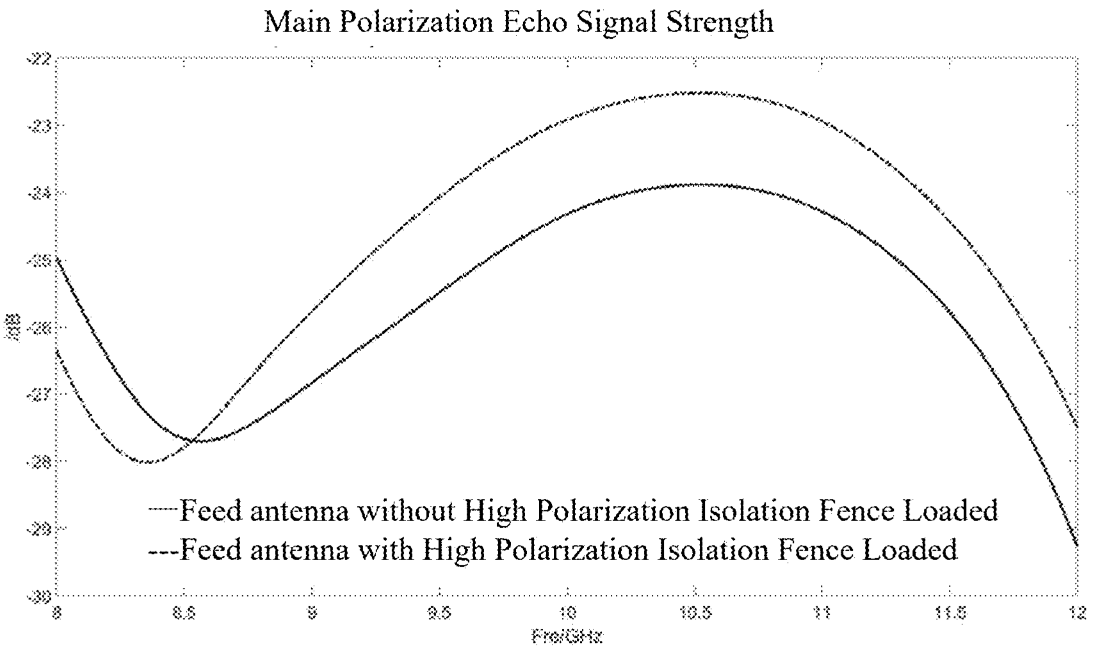
FIG. 5 is a comparison diagram of the main polarization echo signal strength of a high polarization isolation fence.
Figure 6:
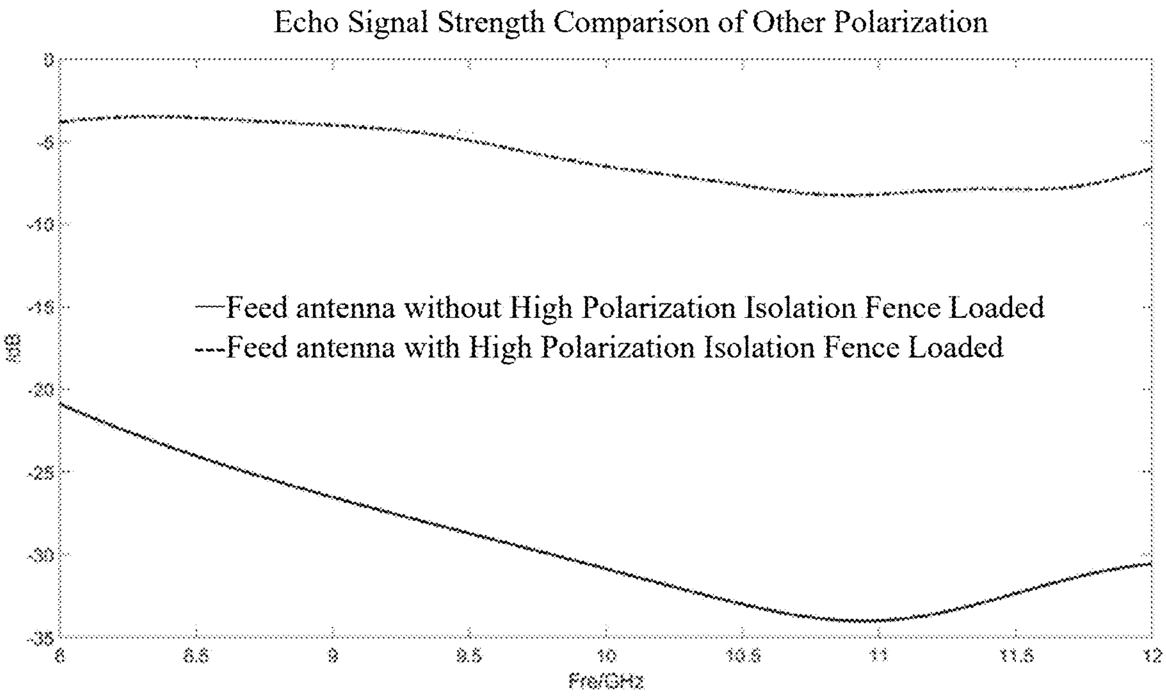
FIG. 6 is a comparison diagram of the echo signal strength of other polarizations of a high polarization isolation fence.

Specifically, FIG. 5 and FIG. 6 are comparison diagrams of the echo signal strength results for the main polarization and other polarizations of a high polarization isolation fence, respectively. The horizontal axis in both figures represents frequency (Fre) in GHz, and the vertical axis represents echo strength in dB. The solid line in the figures represents the state of the feed antenna without the high polarization isolation fence loaded, i.e., the pure feed antenna state, while the dashed line represents the state of the feed antenna with the high polarization isolation fence loaded, i.e., the combined state of feed antenna+polarization fence.

FIG. 5 shows the main polarization echo signal strength. It can be seen that adding the high polarization isolation fence has little impact on the transmission capability of the main polarization. The main polarization direction is the radiation direction with the maximum electric field strength, meaning that the antenna mainly radiates energy along the main polarization direction. Therefore, the smaller the impact of adding the high polarization isolation fence on the main polarization, the better. From FIG. 6, it can be seen that adding the high polarization isolation fence has a significant impact on the transmission capability of other polarizations, with a significant increase in their echo signal strength. This indicates that the high polarization isolation fence can effectively suppress the propagation of other polarizations, i.e., it can effectively suppress the outward propagation of polarizations other than the main polarization, thereby improving polarization purity.

Figure 7:
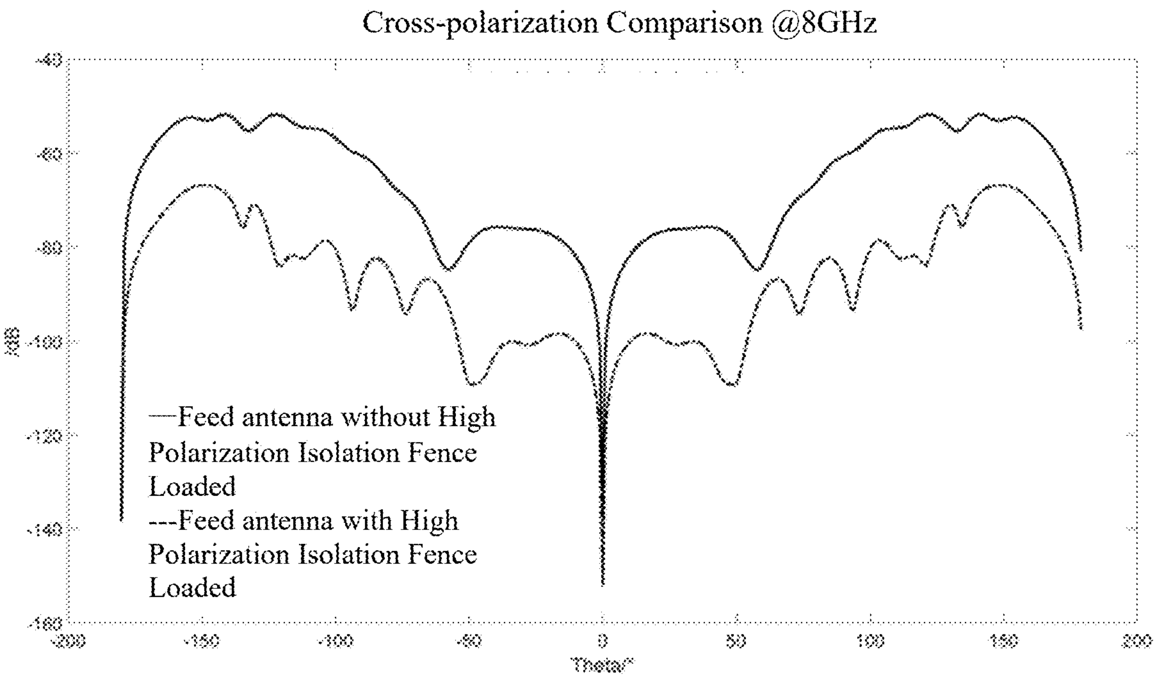
FIG. 7 is a comparison diagram of cross-polarization of a high polarization isolation fence in the 8 GHz frequency band.
Figure 8:
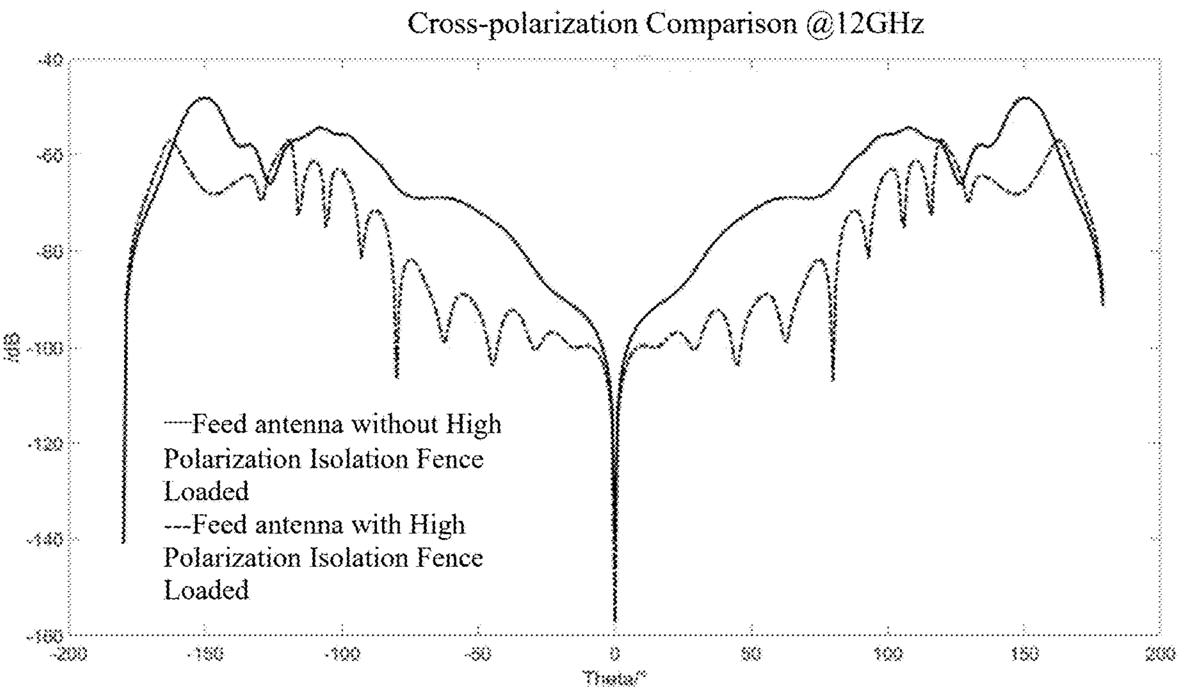
FIG. 8 is a comparison diagram of cross-polarization of a high polarization isolation fence in the 12 GHz frequency band.

FIG. 7 and FIG. 8 are comparison diagrams of the cross-polarization strength results for a high polarization isolation fence in the 8 GHz and 12 GHz frequency bands, respectively. The horizontal axis in both figures represents angle (Theta) in degrees, and the vertical axis represents cross-polarization strength in dB. The solid line in the figures represents the state of the feed antenna without the high polarization isolation fence loaded, while the dashed line represents the state of the feed antenna with the high polarization isolation fence loaded.

By comparing the cross-polarization signal strength of the pure feed antenna and the feed antenna with the high polarization isolation fence added at 8 GHz and 12 GHz in FIG. 7 and FIG. 8, it can be seen that within the 3 dB beamwidth range (i.e., Theta∈[−30°, 30° ]), the cross-polarization of the feed antenna can be significantly improved, and there is a significant improvement in the cross-polarization across the entire frequency band.

Figure 9:
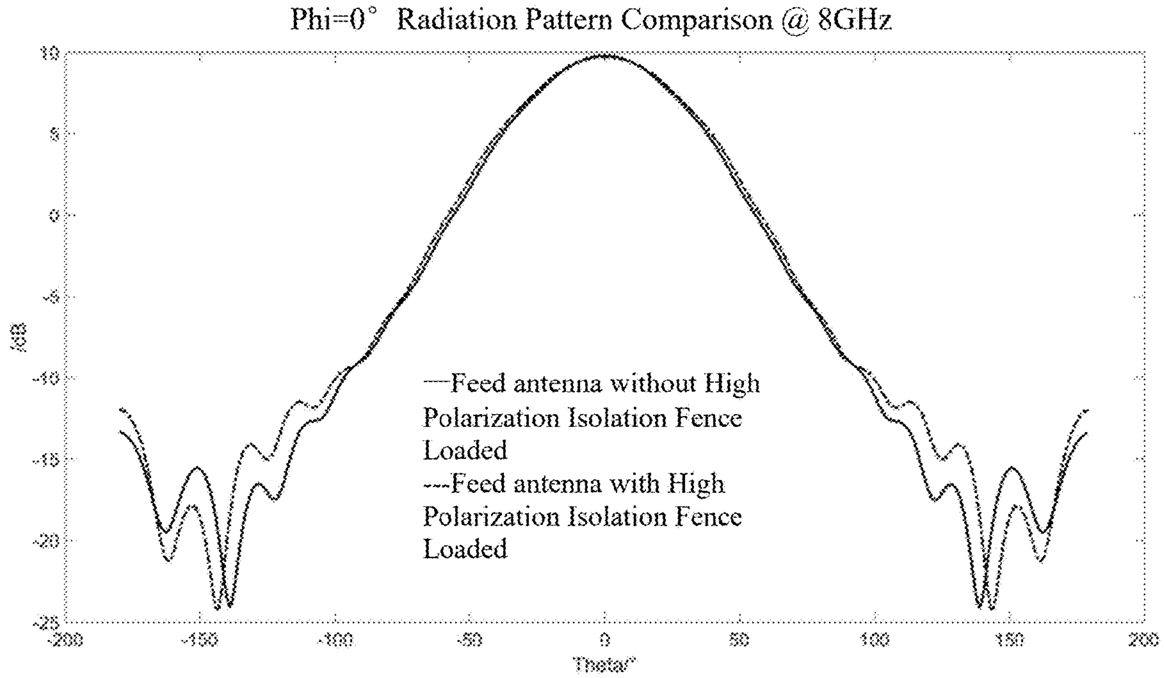
FIG. 9 is a comparison diagram of the radiation pattern in the Phi=0° plane of a high polarization isolation fence in the 8 GHz frequency band.
Figure 10:
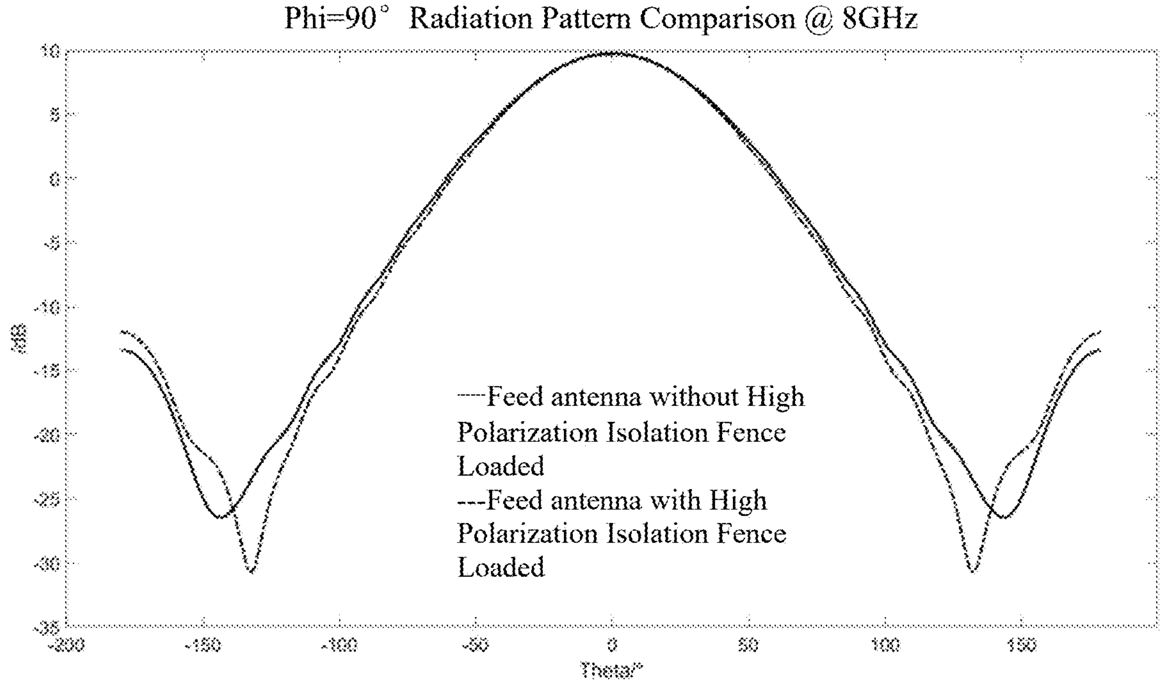
FIG. 10 is a comparison diagram of the radiation pattern in the Phi=90° plane of a high polarization isolation fence in the 8 GHz frequency band.
Figure 11:
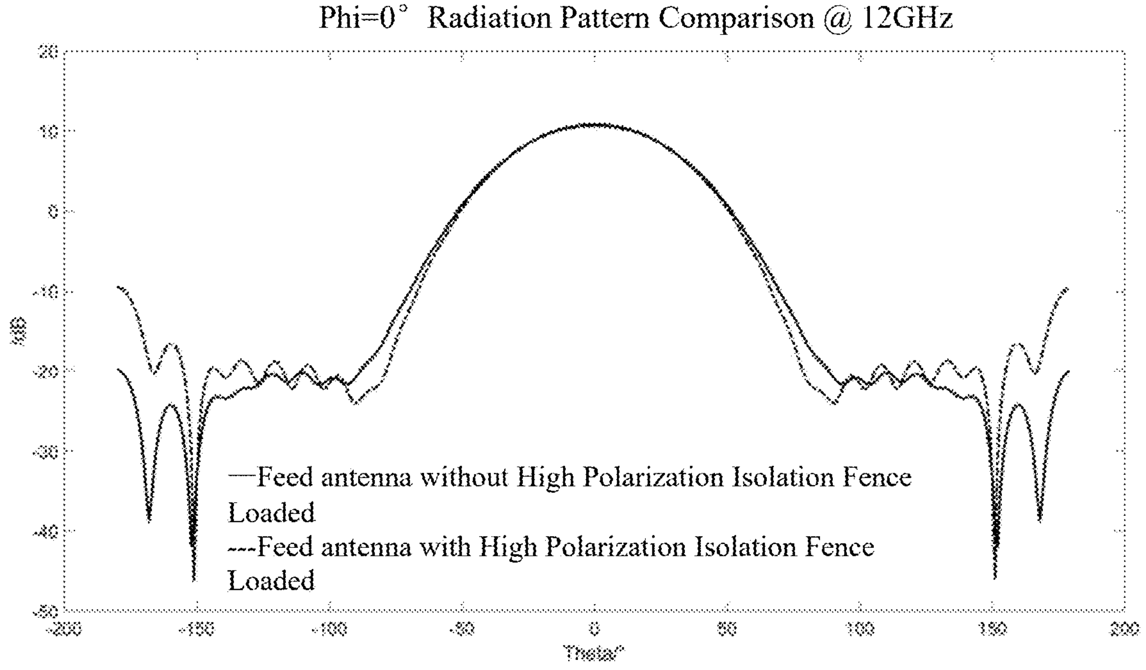
FIG. 11 is a comparison diagram of the radiation pattern in the Phi=0° plane of a high polarization isolation fence in the 12 GHz frequency band.
Figure 12:
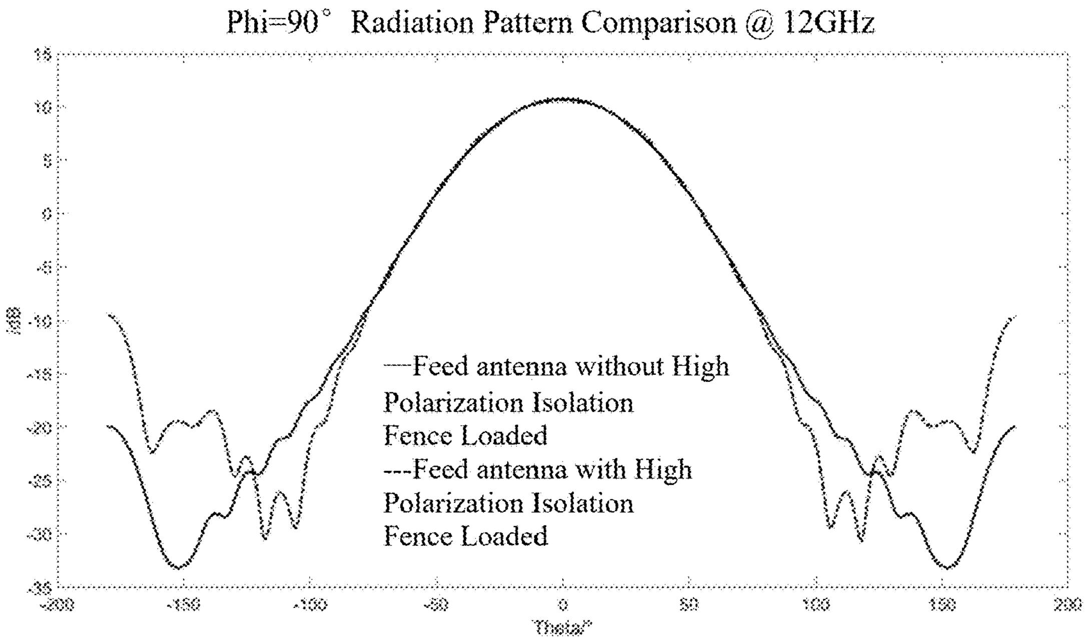
FIG. 12 is a comparison diagram of the radiation pattern in the Phi=90° plane of a high polarization isolation fence in the 12 GHz frequency band.

FIG. 9 and FIG. 10 are comparison diagrams of the feed antenna patterns without and with the polarization isolation fence loaded for a high polarization isolation fence in the Phi=0° and Phi=90° planes at 8 GHz, respectively. FIG. 11 and FIG. 12 are comparison diagrams of the feed antenna patterns without and with the polarization isolation fence loaded for a high polarization isolation fence in the Phi=0° and Phi=90° planes at 12 GHz, respectively. The horizontal axis in all four figures represents angle in degrees, and the vertical axis represents amplitude in dB. The solid line in the figures represents the state of the feed antenna without the high polarization isolation fence loaded, while the dashed line represents the state of the feed antenna with the high polarization isolation fence loaded. It can be seen from these four figures that loading the high polarization isolation fence has little impact on the radiation pattern of the feed antenna 2, which is almost negligible.

S300: Debugging the initial structural parameters of the initialized high polarization isolation fence according to the antenna performance parameters to determine the optimization range corresponding to each structural parameter.

Specifically, in step S300, with the goal of obtaining the optimal high polarization isolation fence dimensions, it is also necessary to consider the optimization principle of minimizing the leakage of electromagnetic waves with polarization perpendicular to the high polarization isolation fence while maximizing the transmission of electromagnetic waves with polarization parallel to the high polarization isolation fence to minimize insertion loss.

Based on the antenna performance parameters of the initialized high polarization isolation fence, when the ratio of the width of the grating strips that constitute the high polarization isolation fence to the distance between two adjacent grating strips is small, leakage loss of electromagnetic waves dominates. When the ratio is large, insertion loss dominates. Therefore, according to the final optimization simulation data analysis, when the ratio of the width of the grating strip to the center distance between adjacent grating strips is in the range of 0.3-0.5, the loss of the grating strip to the main polarization is small.

S400: Calculating the correspondence between the optimization range of each structural parameter and the attribute parameters of the current feed antenna, and obtaining the target high polarization isolation fence based on the optimization range corresponding to each structural parameter and the current antenna performance parameters of the initialized high polarization isolation fence.

Specifically, calculating the correspondence between the optimization range of each structural parameter and the attribute parameters of the current feed antenna includes the following steps:

Step one: Obtaining the attribute parameters of the feed antenna. The attribute parameters at least include the operating frequency range and the maximum aperture of the feed antenna; and Taking the aforementioned feed antenna 2, which is an 8-12 GHz wide-beam corrugated horn as the transmitting feed antenna, as an example, the maximum aperture of the feed antenna is 46 mm, and the wavelength corresponding to the lowest operating frequency of 8 GHz of the feed antenna is 37.47 mm.

Step two: Based on the wavelength corresponding to the lowest operating frequency in the operating frequency range, confirming the correspondence between the optimization range of the distance between the high polarization isolation fence and the feed antenna aperture 3, the optimization range of the center distance between adjacent grating strips, and the optimization range of the width of a single grating strip and the attribute parameters of the feed antenna.

Specifically, the distance optimization range is 0.45-0.55 times the wavelength corresponding to the lowest operating frequency.

It should be noted that when confirming the optimization range of the distance between the high polarization isolation fence and the feed aperture 3, based on the performance test of the initialized high polarization isolation fence, when the initialized high polarization isolation fence is close to the feed aperture 3, it has a greater impact on the antenna radiation pattern. When the distance is larger, it has less impact on the cross-polarization signal strength. It is confirmed that when the distance from the feed aperture 3 is 0.45-0.55 times the wavelength corresponding to the lowest operating frequency of the feed antenna, the cross-polarization signal strength, the main polarization echo signal strength, and the antenna radiation pattern across the entire frequency band exhibit an effect within the preset effect. Here, the preset effect is based on the entire development process because there are many parameters that affect the performance of the high polarization isolation fence. In the process of testing and debugging, an unlimited number of tests cannot be conducted. The preset effect is the termination condition of the design. When the performance of the high polarization isolation fence meets the usage requirements, it means that the required structural parameters for the target high polarization isolation fence have been obtained.

Furthermore, the center distance optimization range is 0.07-0.1 times the wavelength corresponding to the lowest operating frequency. The width optimization range is 0.02-0.03 times the wavelength corresponding to the lowest operating frequency.

Regarding the influence of the center distance and the width of a single grating strip on the deflection angle of electromagnetic waves, the transmission matrix of the high polarization isolation fence can be obtained based on Jones matrix theory. The specific transmission matrix is shown in Formula (I):

$$T=\exp(i\delta/2)\left[\cos(\pi d/\lambda)+i\left(n^2+\sin^2(\pi d/\lambda)\right)^{1/2}/\cos(\pi d/\lambda)+i\left(n^2-\sin^2(\pi d/\lambda)\right)^{1/2}*\exp(-i\delta)\right] \quad \text{Formula (I)}$$

Where T represents the matrix, δ represents the phase difference between the cylindrical bodies of the high polarization isolation fence, d represents the width of the cylindrical body of the high polarization isolation fence, λ represents the wavelength corresponding to the lowest operating frequency of the feed antenna, n represents the refractive index of the material, and i is the imaginary unit. This Formula can be used to calculate the electromagnetic wave transmittance and deflection rotation angle of the high polarization isolation fence. There is also a relationship between the phase difference between the cylindrical bodies of the high polarization isolation fence and the center distance between two adjacent grating strips, so this Formula can be used as a basis for adjusting the center distance and the width of a single grating strip.

In summary, for the aforementioned attribute parameters of the feed antenna, the optimization range of the distance between the high polarization isolation fence and the feed aperture 3 in this application is 16.86 mm-20.6 mm; the optimization range of the width (diameter) of a single grating strip is 0.7494 mm-1.1241 mm, and the optimization range of the grating strip spacing is 3.38 mm-4.1217 mm. It should be noted that the grating strip spacing here refers to the distance between the center positions of two adjacent grating strips.

Step three: Based on the maximum aperture of the feed antenna, confirming the correspondence between the optimization range of a single grating strip length, the optimization range of the total length and total width of the high polarization isolation fence, and the attribute parameters of the feed antenna.

Specifically, the length optimization range and the total length optimization range are both 1.7-1.8 times the maximum aperture; the total width optimization range is 1-1.1 times the maximum aperture.

Therefore, corresponding to the attribute parameters of the aforementioned feed antenna 2, the optimization range of the length of the grating strips and the total length of the entire high polarization isolation fence is selected to be 78.2 mm-82.8 mm, and the total width of the high polarization isolation fence is selected to be 46 mm-50.6 mm.

Furthermore, considering the influence of the thickness of the grating strips of the high polarization isolation fence on the polarization rotation angle of light, the reflection and transmission coefficients of the high polarization isolation fence can be obtained based on the Fresnel Formulas, as shown in Formula (II) and Formula (III):

$$t = 2*n1*\cos\theta1/(n1*\cos\theta1 + n2*\cos\theta2) \quad \text{Formula (II)}$$

$$r = (n1*\cos\theta1 - n2*\cos 2)/(n1*\cos\theta1 + n2*\cos\theta2) \quad \text{Formula (III)}$$

Where r is the reflection coefficient, t is the transmission coefficient, n1 and n2 represent the refractive indices of the high polarization isolation fence material and the application environment medium, respectively, θ1 and θ2 and represent the incident angle and refraction angle, respectively. By calculating the reflection and transmission coefficients, the transmittance and polarization rotation angle of the high polarization isolation fence can be obtained. Based on this, it can be seen that the design of the high polarization isolation fence needs to consider various factors, including but not limited to the aforementioned width of the grating strips, the center distance between adjacent grating strips, and the refractive index and thickness of the material.

The step of obtaining the target high polarization isolation fence based on the optimization range corresponding to each initial structural parameter and the current antenna performance parameters of the initialized high polarization isolation fence further includes the following steps:

Step one: Selecting candidate structural parameters within the optimization range corresponding to each structural parameter, and performing parameterized modeling according to the candidate structural parameters to obtain a candidate high polarization isolation fence model.

When selecting candidate structural parameters within the optimization range of each structural parameter, many aspects need to be considered. Therefore, in the selection process, it is only necessary to adjust within the optimization range of each structural parameter. When structural parameters that meet the preset effect are obtained, it is sufficient. The preset effect, for example, can be that the cross-polarization of the feed antenna can be significantly improved within the 3 dB beamwidth range (i.e., Theta∈[−30°, 30° ]).

Step two: Performing parameter scanning on the candidate high polarization isolation fence model within the optimization range of each structural parameter and obtaining the antenna performance parameters corresponding to the candidate high polarization isolation fence model.

With the preset effect as the goal, each structural parameter is adjusted within the optimization range, and parameter scanning is performed on the candidate high polarization isolation fence model. The parameters of the candidate high polarization isolation fence obtained from the parameter scanning can be used as a basis for subsequent adjustments.

Step three: Obtaining the antenna performance parameters when the initialized high polarization isolation fence is not loaded, and selecting the optimal structural parameters within the corresponding optimization range of each structural parameter by comparing with the antenna performance parameters when the candidate high polarization isolation fence model is provided (refer to the comparison tests in FIGS. 5-12) to form the target high polarization isolation fence. In this application, the final structural parameters of the high polarization isolation fence after optimization are as follows: the total height of the high polarization isolation fence and single grating strip length are selected to be 80 mm, the total width is selected to be 48 mm, the width of a single grating strip is selected to be 1 mm, the distance between the high polarization isolation fence and the feed aperture is selected to be 18 mm, and the center distance between adjacent grating strips is selected to be 3 mm.

In summary, on the one hand, the present disclosure can obtain the optimization range of each corresponding structural parameter by performing performance tests on the initialized high polarization isolation fence. After the optimization range is defined, it can provide a range for further optimization of subsequent structural parameters, avoiding blind adjustment of structural parameters. On the other hand, by establishing a correspondence relationship between the optimization range of each structural parameter and the attribute parameters of the current feed antenna, the present disclosure obtains the multiple between the structural parameters and the feed antenna structural parameters. This also provides a preliminary optimization range for the subsequent design of polarization fences. Even if the feed antenna structural parameters change, the initial structural parameters of the initialized high polarization isolation fence in other projects can be set according to the correspondence relationship obtained by this method, simplifying the design process and further shortening the design cycle of polarization fences.

Example 2

Figure 13:
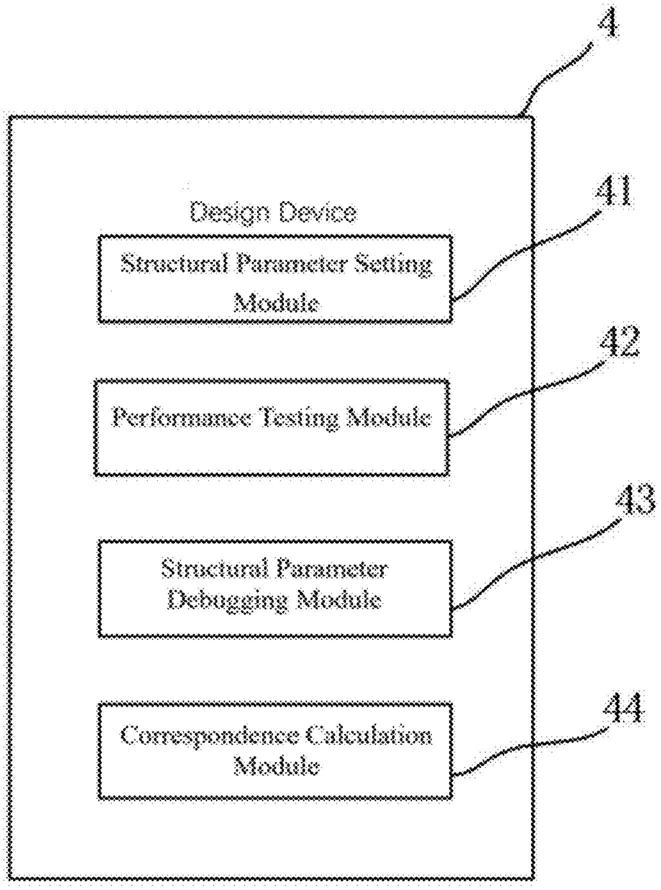
FIG. 13 is a schematic diagram illustrating the structure of a design device for a high polarization isolation fence.

As shown in FIG. 13, this example provides a design device for a high polarization isolation fence, which employs the design method for a high polarization isolation fence described in Example 1. Specifically, the design device 4 includes:

A structural parameter setting module 41 configured to set the material, application environment, and initial structural parameters of the high polarization isolation fence to form an initialized high polarization isolation fence. The structural parameters at least include: the distance between the high polarization isolation fence and the feed aperture, the center distance between adjacent grating strips, the length and width of a single grating strip, the total length and total width of the high polarization isolation fence, and the shape of the grating strip; and A performance testing module 42 configured to perform performance tests on the initialized high polarization isolation fence to obtain antenna performance parameters with the initialized high polarization isolation fence and without the high polarization isolation fence loaded. The antenna performance parameters at least include: the cross-polarization signal strength within the 3 dB beamwidth range of the antenna, the main polarization echo signal strength of the antenna, and the antenna radiation pattern; and A structural parameter debugging module 43 configured to debug the initial structural parameters of the initialized high polarization isolation fence according to the antenna performance parameters to determine the optimization range corresponding to each structural parameter and to obtain the target high polarization isolation fence based on the optimization range corresponding to each structural parameter and the current antenna performance parameters of the initialized high polarization isolation fence; and A correspondence calculation module 44 configured to calculate the correspondence between the optimization range of each structural parameter and the attribute parameters of the current feed antenna.

In this example, the performance testing module 42 is further used for performance testing after the candidate high polarization isolation fence model is established, specifically including performing parameter scanning on the candidate high polarization isolation fence model within the optimization range of each structural parameter, obtaining the antenna performance parameters corresponding to the candidate high polarization isolation fence model, and obtaining the antenna performance parameters when the initialized high polarization isolation fence is not loaded. By comparing with the antenna performance parameters when the candidate high polarization isolation fence model is provided, it assists technical personnel in selecting the optimal structural parameters within the corresponding optimization range of each structural parameter in the structural parameter debugging module 43, thereby forming the target high polarization isolation fence.

The correspondence calculation module 44 is further used to obtain the attribute parameters of the feed antenna, such as the operating frequency range and the maximum aperture of the feed antenna. Then, based on the attribute parameters of the current feed antenna and the optimization range of each structural parameter of the high polarization isolation fence obtained in the performance test of the initialized high polarization isolation fence, the correspondence relationship between the optimization range of the structural parameters and the attribute parameters of the current feed antenna is calculated. For example, the total width optimization range of the high polarization isolation fence is 1-1.1 times the maximum aperture.

The above description is only a preferred example of the present disclosure and an explanation of the technical principles applied. Those skilled in the art should understand that the scope of the present disclosure involved in the present disclosure is not limited to the technical solution formed by the specific combination of the above technical features. It should also cover other technical solutions formed by arbitrarily combining the above technical features or their equivalent features without departing from the inventive concept. For example, the above features can be replaced with technical features disclosed in the present disclosure (but not limited to) that have similar functions to form other technical solutions.

What is claimed is:

1. A design method for a high polarization isolation fence, wherein the high polarization isolation fence includes a plurality of grating strips arranged along a first direction; the first direction is set parallel to a polarization direction of a feed antenna; the feed antenna has a feed aperture;

the design method includes following steps:

setting materials, application environment, and initial structural parameters of the high polarization isolation fence to form an initialized high polarization isolation fence; the initial structural parameters at least include: a distance between the high polarization isolation fence and the feed aperture, a center distance between adjacent grating strips, a length of a single grating strip, a width of a single grating strip, a total length and total width of the high polarization isolation fence, and shapes of the grating strip; and performing performance tests on the initialized high polarization isolation fence to obtain performance parameters of an antenna with the initialized high polarization isolation fence and without the high polarization isolation fence loaded; the performance parameters of the antenna at least include: a cross-polarization signal strength within a 3 dB beamwidth range of the antenna, a main polarization echo signal strength of the antenna, and an antenna radiation pattern; and debugging the initial structural parameters of the initialized high polarization isolation fence according to the performance parameters of the antenna to determine an optimization range corresponding to each structural parameter; and calculating the correspondence between the optimization range of each structural parameter and attribute parameters of the feed antenna, and obtaining a target high polarization isolation fence based on the optimization range corresponding to each structural parameter and the performance parameters of the antenna of the initialized high polarization isolation fence.

2. The design method for a high polarization isolation fence of claim 1, wherein the step of calculating the correspondence between the optimization range of each structural parameter and the attribute parameters of the feed antenna specifically includes:

obtaining attribute parameters of the feed antenna; the attribute parameters at least include an operating frequency range and a maximum aperture of the feed antenna; and confirming the correspondence between the optimization range of a distance between the high polarization isolation fence and the feed aperture, the optimization range of a center distance between adjacent grating strips, and the optimization range of the width of a single grating strip and the attribute parameters of the feed antenna based on a wavelength corresponding to a lowest operating frequency in the operating frequency range; and confirming the correspondence between an optimization range of a single grating strip length and an optimization range of a total length and an optimization range of a total width of the high polarization isolation fence and the attribute parameters of the feed antenna based on the maximum aperture of the feed antenna.

3. The design method for a high polarization isolation fence of claim 2, wherein the correspondence between: a distance optimization range of the high polarization isolation fence and the feed aperture, a center distance optimization range of adjacent grating strips, a width optimization range of the width of a single grating strip and the attribute parameters of the feed antenna, specifically including:

the distance optimization range of the high polarization isolation fence and the feed aperture is 0.45-0.55 times the wavelength corresponding to the lowest operating frequency; and the center distance optimization range is 0.07-0.1 times the wavelength corresponding to the lowest operating frequency; and the width optimization range is 0.02-0.03 times the wavelength corresponding to the lowest operating frequency.

4. The design method for a high polarization isolation fence of claim 3, wherein the step of confirming an optimization range of a distance between the high polarization isolation fence and the feed aperture based on a wavelength corresponding to the lowest operating frequency in the operating frequency range further includes:

when 0.45-0.55 times the wavelength corresponding to the lowest operating frequency is used as a distance optimization range, obtaining cross-polarization signal strength, the main polarization echo signal strength, and an antenna radiation pattern in an entire frequency band of the antenna to confirm that a current antenna performance index is within a preset effect.

5. The design method for a high polarization isolation fence of claim 2, wherein the correspondence between the optimization range of the single grating strip length, optimization range of the total length and the optimization range of the total width of the high polarization isolation fence, and the attribute parameters of the feed antenna specifically includes:

the optimization range of the single grating strip length and the optimization range of the total length are both 1.7-1.8 times the maximum aperture; and the optimization range of the total width is 1-1.1 times the maximum aperture.

6. The design method for a high polarization isolation fence of claim 1, wherein the step of obtaining a target high polarization isolation fence based on an optimization range corresponding to each structural parameter and antenna performance parameters of the initialized high polarization isolation fence specifically includes:

selecting candidate structural parameters within the optimization range corresponding to each structural parameter, and performing parameterized modeling according to the candidate structural parameters to obtain a candidate high polarization isolation fence model; and performing parameter scanning on the candidate high polarization isolation fence model within the optimization range of each structural parameter and obtaining the antenna performance parameters corresponding to the candidate high polarization isolation fence model; and obtaining the antenna performance parameters when the high polarization isolation fence is not loaded, and selecting optimal structural parameters within the corresponding optimization range of each structural parameter by comparing with the antenna performance parameters when the candidate high polarization isolation fence model is provided, to form the target high polarization isolation fence.

7. The design method for a high polarization isolation fence of claim 6, wherein debugging the initial structural parameters of the initialized high polarization isolation fence according to the antenna performance parameters to determine an optimization range corresponding to each structural parameter includes:

minimizing leakage of electromagnetic waves with polarization perpendicular to the high polarization isolation fence, while maximizing transmission of electromagnetic waves with polarization parallel to the high polarization isolation fence to minimize insertion loss; and based on a performance test on the initialized high polarization isolation fence, obtaining a ratio of the width of a grating strip to the center distance between adjacent grating strips within 0.3-0.5 to achieve minimized insertion loss.

8. A design device for a high polarization isolation fence, comprising:

a structural parameter setting module configured to set a material, application environment, and initial structural parameters of the high polarization isolation fence to form an initialized high polarization isolation fence; the initial structural parameters at least include: a distance between the high polarization isolation fence and a feed aperture, a center distance between adjacent grating strips, a length of a single grating strip, a width of a single grating strip, a total length and total width of the high polarization isolation fence, and shapes of the single grating strip; and a performance testing module configured to perform performance tests on the initialized high polarization isolation fence to obtain antenna performance parameters with the initialized high polarization isolation fence and without the high polarization isolation fence loaded; the antenna performance parameters at least includes: cross-polarization signal strength within a 3 dB beamwidth range of the antenna, a main polarization echo signal strength of the antenna, and an antenna radiation pattern; and a structural parameter debugging module configured to debug the initial structural parameters of the initialized high polarization isolation fence according to the antenna performance parameters to determine an optimization range corresponding to each structural parameter and to obtain a target high polarization isolation fence based on the optimization range corresponding to each structural parameter and antenna performance parameters of the initialized high polarization isolation fence; and a correspondence calculation module configured to calculate correspondence between the optimization range of each structural parameter and attribute parameters of a feed antenna.

* * * * *